United States Patent
Ooura et al.

(10) Patent No.: US 6,861,488 B2
(45) Date of Patent: Mar. 1, 2005

(54) PROCESS FOR PRODUCING A VINYL CHLORIDE-BASED POLYMER

(75) Inventors: Makoto Ooura, Kashima-gun (JP); Tadashi Amano, Kashima-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 108 days.

(21) Appl. No.: 10/642,172

(22) Filed: Aug. 18, 2003

(65) Prior Publication Data

US 2004/0034181 A1 Feb. 19, 2004

(30) Foreign Application Priority Data

Aug. 19, 2002 (JP) ........................................ 2002-238568

(51) Int. Cl.$^7$ ................................................. C08F 4/28
(52) U.S. Cl. ..................................... 526/227; 526/344.2
(58) Field of Search ............................... 526/227, 344.2

(56) References Cited

U.S. PATENT DOCUMENTS

| | | | | |
|---|---|---|---|---|
| 4,063,013 A | * | 12/1977 | Friedman et al. | ............ 526/227 |
| 5,011,897 A | | 4/1991 | Amano et al. | |
| 6,433,074 B1 | | 8/2002 | Ooura et al. | |
| 6,600,000 B1 | | 7/2003 | Ooura et al. | |

FOREIGN PATENT DOCUMENTS

| | | | |
|---|---|---|---|
| EP | 281210 A2 * | 9/1988 | ............. C08F/2/18 |
| JP | 7-252307 | 10/1995 | |

OTHER PUBLICATIONS

Patent Abstracts of Japan, JP 57–139104, Aug. 27, 1982.

* cited by examiner

*Primary Examiner*—William K. Cheung
(74) *Attorney, Agent, or Firm*—Oblon, Spivak, McClelland, Maier & Neustadt, P.C.

(57) ABSTRACT

There is provided a process for producing a vinyl chloride-based polymer by conducting a suspension polymerization in an aqueous medium using an oil soluble polymerization initiator, wherein the oil soluble polymerization initiator utilizes a combination of (A) t-amyl peroxyneodecanoate and (B) a peroxide-based polymerization initiator with a 10 hour half-life temperature in a solution with a concentration of 0.1 mol/liter in trichloroethylene within a range of at least 30° C. but less than 55° C., and when a predetermined polymerization conversion rate is reached, the polymerization reaction temperature is raised by a predetermined amount, followed by addition of an antioxidant to said polymerization mixture to halt the polymerization reaction. According to this process, a vinyl chloride-based polymer with good anti-initial discoloration can be produced in high yield and with good productivity.

12 Claims, No Drawings

PROCESS FOR PRODUCING A VINYL CHLORIDE-BASED POLYMER

BACKGROUND OF THE INVENTION

1. Field of the Invention

The present invention relates to a process for producing a vinyl chloride-based polymer which enables a vinyl chloride-based polymer having good anti-initial discoloration to be produced with good productivity.

2. Description of the Prior Art

Vinyl chloride-based polymers are typically produced by conducting a suspension polymerization of either vinyl chloride monomer or a monomer mixture containing vinyl chloride monomer, in an aqueous medium, using an oil soluble polymerization initiator and in the presence of a suspension stabilizer.

Amongst conventional processes for producing vinyl chloride-based polymers, known techniques that have been adopted for improving the polymer yield without lengthening the polymerization time include processes that use large quantities of an oil soluble polymerization initiator, and processes in which the temperature inside the polymerization vessel is raised when the polymerization reaction has progressed substantially and the pressure inside the polymerization vessel begins to fall (for example, Japanese Laid-open Patent Publication (kokai) No. 9-143208 (JP9-143208A)). However, the polymers obtained from these processes tend to be colored slightly yellow when formed into products such as films or the like. In other words, the anti-initial discoloration is poor.

It is known that the anti-initial discoloration varies significantly depending on the type of polymerization initiator used. For example, it is known that the use of an initiator such as di-2-ethylhexyl peroxydicarbonate results in an improved yield but a large deterioration in the anti-initial discoloration of the product polymer, whereas the use of an initiator such as t-butyl peroxyneodecanoate produces good anti-initial discoloration but produces only a small increase in yield. Hence, with conventional processes for producing vinyl chloride-based polymers, it has proved difficult to obtain a vinyl chloride based polymer having good anti-initial discoloration with a high yield.

SUMMARY OF THE INVENTION

An object of the present invention is to provide a process for producing a vinyl chloride-based polymer which enables a vinyl chloride-based polymer having good anti-initial discoloration to be produced with good productivity.

In order to resolve the problems described above, the present invention provides:

a process for producing a vinyl chloride-based polymer by conducting a suspension polymerization of either vinyl chloride monomer or a mixture of vinyl chloride monomer and a monomer capable of copolymerization with the vinyl chloride monomer, in an aqueous medium and using an oil soluble polymerization initiator in a polymerization vessel, wherein the oil soluble polymerization initiator comprises (A) t-amyl peroxyneodecanoate and (B) an organic peroxide that is different from the component (A) and has a 10 hour half-life temperature in a solution with a concentration of 0.1 mol/liter in trichloroethylene within a range from 30° C. to 55° C., and when the polymerization conversion rate reaches a value within a range of from 65% to 90%, the reaction temperature of a polymerization mixture inside the polymerization vessel is raised by a temperature increase of between 5 and 30° C., followed by addition of an antioxidant to said polymerization mixture.

DETAILED DESCRIPTION OF THE PREFERRED EMBODIMENTS

As follows is a more detailed description of the present invention.

In this description, the term "initial discoloration" refers to discoloration that occurs when a plasticizer or the like is added to a vinyl chloride-based polymer and the polymer is then molded into a sheet under heating and pressure, and the term "anti-initial discoloration" refers to resistance that a vinyl chloride-based polymer has to this type of discoloration.

Oil Soluble Polymerization Initiator

An oil soluble polymerization initiator used in a production process of the present invention is a combination of the t-amyl peroxyneodecanoate of the aforementioned component (A) (hereafter referred to as the initiator (A)), and an organic peroxide of the component (B) described below.

The organic peroxide initiator of the component (B) (hereafter referred to as the initiator (B)) is a different organic peroxide from the aforementioned t-amyl peroxyneodecanoate, and has a 10 hour half-life temperature in a solution with a concentration of 0.1 mol/liter in trichloroethylene within a range from 30° C. to 55° C., e.g., in a range of at least 30° C. but less than 55° C. This initiator (B) is selected appropriately in accordance with the reaction temperature inside the polymerization vessel (hereafter also referred to as the polymerization temperature). For example, if the polymerization temperature is less than 59° C., then using an organic peroxide with a 10 hour half-life temperature from 30° C. to 50° C., e.g., in a range of at least 30° C. but less than 50° C. as the initiator (B) is preferred. However if the polymerization temperature is 59° C. or higher then using an organic peroxide with a 10 hour half-life temperature of 44° C. to 55° C., e.g., at least 44° C. but less than 55° C. as the initiator (B) is preferred. If the 10 hour half-life temperature of this initiator (B) is too low, heat generation in the initial stages of the polymerization increases significantly, and ensuring adequate heat removal from the polymerization vessel can become difficult. In contrast, if the 10 hour half-life temperature is too high, then large quantities of the polymerization initiator need to be added, which not only causes a marked deterioration in the anti-initial discoloration of the product polymer, but is also undesirable economically.

Methods for measuring the 10 hour half-life temperature described above are well known. For example, the 10 hour half-life temperature of an organic peroxide can be determined by dissolving the organic peroxide in trichloroethylene to generate a solution with a concentration of 0.1 mol/liter, sealing this solution inside a vessel, and then maintaining the solution at a predetermined temperature to allow the organic peroxide to undergo thermal decomposition, while measuring the relationship between the time elapsed and the change in concentration of the organic peroxide.

In the present invention, it is assumed that the decomposition reaction of the organic peroxide at each predetermined temperature is the primary reaction, and the 10 hour half-life temperature is then determined in the manner described below.

First, at a predetermined constant temperature, the formula shown below is used to determine the value of k.

$$\log(a/x) = (k/2.303)t$$

(wherein, x is the concentration (mol/liter) of the organic peroxide at a time t, a is the initial concentration (mol/liter) of the organic peroxide, k is a decomposition rate constant determined by the temperature, and t is the time elapsed). The value of k is then substituted into the following formula to determine the half-life.

$$t_{1/2}(\text{half-life}) = (ln2)/k$$

The temperature required to produce a half-life of 10 hours is then calculated.

Specific examples of the initiator (B) include diisobutyl peroxide (10 hour half-life temperature: 33° C., hereafter temperatures shown in brackets refer to 10 hour half-life temperatures), 3-hydroxy-1,1-dimethylbutyl peroxyneodecanoate (37° C.), α-cumyl peroxyneodecanoate (38° C.), 1,1,3,3-tetramethylbutyl peroxyneodecanoate (44° C.), t-butyl peroxyneodecanoate (48° C.), t-butyl peroxyneoheptanoate (53° C.), diisopropyl peroxydicarbonate (41° C.), di-sec-butyl peroxydicarbonate (51° C.) and di-2-ethylhexyl peroxydicarbonate (49° C.). These compounds may be used singularly, or in combinations of two or more compounds.

The combined total of the quantities of the initiator (A) and the initiator (B) is typically within a range from 0.02 to 0.15 parts by weight, and preferably from 0.04 to 0.13 parts by weight, and even more preferably from 0.05 to 0.12 parts by weight, per 100 parts by weight of the monomer(s) (the vinyl chloride monomer or the monomer mixture containing a vinyl chloride monomer) supplied to the polymerization. If this combined quantity is too large then the anti-initial discoloration of the product polymer may deteriorate. Furthermore, if the combined quantity is too large, the heating value increases, and heat removal from the polymerization vessel becomes insufficient, making it difficult to maintain a constant polymerization temperature, and as a result, it becomes more difficult to produce a vinyl chloride-based polymer with the desired degree of polymerization. In contrast if the combine quantity of the initiators is too small, the reduction effect on the polymerization time is inadequate, causing a fall in productivity.

The ratio of the quantities of the initiator (A) and the initiator (B), expressed in terms of the weight ratio (A)/(B), is preferably within a range from 1/9 to 9/1, and even more preferably from 1/5 to 5/1. If this ratio is too small (that is, if the proportion of the initiator (A) is too low), then the anti-initial discoloration of the product polymer deteriorates and the improvement in yield is minimal. In contrast, if the ratio is too large (that is, if the proportion of the initiator (A) is too high), then a bias develops in the heating value within the polymerization vessel, and the quantity of heat removal from the polymerization vessel becomes insufficient. Consequently, the combined quantity of the initiator (A) and the initiator (B) that can be used is restricted, and the productivity falls.

The oil soluble initiator can be introduced into the polymerization vessel using known methods. For example, the polymerization initiator can be combined with an appropriately selected solvent or dispersant, and then added to the polymerization vessel as a solution, an emulsion, or a suspension. The oil soluble initiator may be introduced during the addition of water or the monomer(s) to the polymerization vessel, or may be introduced following completion of the addition of the other components. The oil soluble initiator may also be mixed uniformly with the monomer(s) and then introduced together with the monomer(s). Alternatively, the oil soluble initiator may also be introduced to the polymerization vessel as an aqueous emulsion formed with the aqueous medium.

Polymerization Conditions

In a production process of the present invention, when the polymerization conversion rate reaches a value within a range from 65% to 90%, e.g., in a range of at least 65% but less than 90%. the reaction temperature inside the polymerization vessel is raised by a temperature increase of between 5 and 30° C., and following this raising of the reaction temperature, more particularly at a temperature thus raised, an antioxidant must be added to the polymerization mixture. The polymerization conversion rate at the time when the reaction temperature is raised, is preferably in a range from 65% to 85%, more preferably in a range from 70% to 80%.

If the temperature raising described above is started before the polymerization conversion rate reaches 65%, then the polymerization reaction may accelerate rapidly, making control of the temperature inside the polymerization vessel difficult, and the pressure inside the polymerization vessel may also rise rapidly, both of which are undesirable from a safety perspective. In contrast, if the temperature raising is started after the polymerization conversion rate has already exceeded 90%, then the improvement in yield is minimal, and the polymerization time can increase, meaning the temperature increase cannot contribute to productivity improvement.

Furthermore, if the temperature increase is less than 5° C. then the polymer yield deteriorates. In contrast, if the temperature increase is too large and exceeds 30° C., the anti-initial discoloration of the product polymer deteriorates undesirably.

There are no particular restrictions on the time required to raise the polymerization temperature by a temperature of between 5 and 30° C., and typical time values are from 2 to 60 minutes, with time values from 10 to 40 minutes being preferred.

In the present invention, the polymerization conversion rate was calculated for each different quantity of each polymerization initiator by conducting a polymerization reaction in a 5 L polymerization vessel, and then calculating the polymerization conversion rate based on the results of determining the relationship between the polymerization time and the polymerization conversion rate.

In other words, 2600 g of deionized water, 39 g of a 2% by weight aqueous solution of a partially saponified polyvinyl alcohol with a saponification ratio of 80.5 mol %, and 26 g of a 2% by weight aqueous solution of a hydroxypropylmethylcellulose with a methoxy substitution ratio of 28.5% by weight and a hydroxypropoxy substitution ratio of 8.9% by weight were combined in a stainless steel polymerization vessel with an internal capacity of 5 L. The inside of the polymerization vessel was then degassed until the internal pressure reached 8 kPa·abs, and 1300 g of vinyl chloride monomer was added.

With the mixture undergoing constant stirring, a predetermined quantity of a predetermined type of polymerization initiator was added, and the temperature was raised. When the temperature inside the polymerization vessel reached 57.0° C., that temperature was maintained and the polymerization was allowed to proceed. One hour after the temperature raising process had been started, 26 g of a 10% by weight aqueous solution of sodium nitrite was added to completely halt the polymerization, and any unreacted monomer was recovered. The total weight of the vinyl chloride polymer obtained by dewatering and drying the polymer slurry was weighed, and the polymerization conversion rate at the point 1 hour after the start of the temperature raising process was determined.

Using the same method, the polymerization conversion rates at subsequent 30 minute intervals, namely at 1.5, 2, 2.5, 3, 3.5, 4, 4.5 and 5 hours after the start of the temperature raising process, were determined, and the relationship between the polymerization time and the polymerization conversion rate was determined. This relationship between the polymerization time and the polymerization conversion rate was generated for each quantity of each of the required polymerization initiators.

In the present invention, adding an antioxidant enables the anti-initial discoloration and the thermal stability of the product polymer to be improved. The antioxidant has a polymerization inhibiting function, and by adding the antioxidant the polymerization reaction can be halted.

There are no particular restrictions on the antioxidant used in the present invention, and the types of antioxidants typically used in conventional vinyl chloride-based polymer production are suitable. Specific examples include phenol compounds such as 2,2-di(4-hydroxyphenyl)propane, hydroquinone, p-methoxyphenol, t-butylhydroxyanisole, n-octadecyl 3-(4-hydroxy-3,5-di-t-butylphenyl)propionate, 2,5-di-t-butylhydroquinone, 3,5-di-t-butyl-4-hydroxytoluene, 2,2'-methylene-bis(4-ethyl-6-t-butylphenol), pentaerythritol tetrakis[3-(3,5-di-t-butyl-4-hydroxyphenyl)propionate], 2,6-di-t-butyl-4-sec-butylphenol, 2,6-di-t-butyl-4-methylphenol, t-butylcatechol, 4,4'-thiobis(6-t-butyl-m-cresol), tocopherol and nordihydroguaiaretic acid; semicarbazide derivatives such as semicarbazide, 1-acetylsemicarbazide, 1-chloroacetylsemicarbazide, 1-dichloroacetylsemicarbazide, 1-benzoylsemicarbazide and semicarbazone; thiocarbazide derivatives such as carbohydrazide, thiosemicarbazide and thiosemicarbazone; amine compounds such as phenylnaphthylamine, N,N'-diphenyl-p-phenylenediamine and 4,4'-bis(dimethylbenzyl) diphenylamine; nitro and nitroso compounds such as nitroanisole, N-nitrosodiphenylamine, nitroaniline and the aluminum salt of N-nitrosophenylhydroxylamine; phosphorus compounds such as triphenyl phosphite, diphenylisodecyl phosphite, phenyldiisodecyl phosphite, 4,4'-butylidene-bis(3-methyl-6-t-butylphenyl-di-tridecylphosphite), dioctadecylpentaerythritol diphosphite, tris(nonylphenyl) phosphite and tris(dinonylphenyl) phosphite; and sulfur compounds such as dilauryl 3,3'-thiodipropionate, dimyristyl 3,3'-thiodipropionate, distearyl 3,3'-thiodipropionate, dodecylmercaptan and N,N'-diphenylthiourea. These antioxidants can be used singularly, or in combinations of two or more compounds.

Of the above antioxidants, from the viewpoints of ensuring good anti-initial discoloration of the product polymer, and limiting scale adhesion to the polymerization vessel, 3,5-di-t-butyl-4-hydroxytoluene, t-butylhydroxyanisole, t-butylhydroquinone, 2,6-di-t-butyl-4-sec-butylphenol and n-octadecyl 3-(3,5-di-t-butylphenyl-4-hydroxyphenyl) propionate are preferred.

There are no particular restrictions on the method used to add the antioxidant, and typically used methods, including dissolving the antioxidant in an organic solvent such as methanol, ethanol or acetone prior to addition, adding the antioxidant as a water-based emulsion, or adding the antioxidant in a heated molten state, can all be effectively used.

The quantity of antioxidant added is preferably within a range from 0.005 to 0.05 parts by weight per 100 parts by weight of the monomer.

Other Conditions

In a process for producing a vinyl chloride-based polymer according to the present invention, with the exceptions of using an oil soluble initiator as described above, and raising the reaction temperature inside the polymerization vessel by a temperature increase between 5° C. and 30° C. when the polymerization conversion rate reaches a value within a range from 65% to 90%, and following the temperature raising, i.e., at a temperature thus raised, adding an antioxidant to the polymerization mixture, the production process can be conducted under the same conditions as those used in conventional vinyl chloride-based polymer production processes.

(Monomer)

The monomer raw material used in the present invention is either vinyl chloride or a monomer mixture containing vinyl chloride as the primary constituent. A monomer mixture containing vinyl chloride as the primary constituent comprises at least 50% by weight of vinyl chloride, as well as another monomer which is copolymerizable with vinyl chloride. Examples of the monomer which is copolymerizable with vinyl chloride include vinyl esters such as vinyl acetate and vinyl propionate; acrylate esters or methacrylate esters such as methyl acrylate and ethyl acrylate; olefins such as ethylene and propylene; as well as maleic anhydride, acrylonitrile, styrene and vinylidene chloride. These monomers may be used singularly, or in combinations of two or more monomers.

(Suspension Stabilizer)

In a process of the present invention, there are no particular restrictions on the suspension stabilizer used in those cases in which the aforementioned vinyl chloride or monomer mixture containing vinyl chloride is polymerized within an aqueous medium, and the types of stabilizers used in conventional vinyl chloride-based polymer production processes are suitable. Specific examples of this suspension stabilizer include water soluble cellulose ethers such as methylcellulose, hydroxyethylcellulose, hydroxypropylcellulose and hydroxypropylmethylcellulose; partially saponified polyvinyl alcohols such as water soluble partially saponified polyvinyl alcohol and oil soluble partially saponified polyvinyl alcohol; and water soluble polymers such as acrylic acid polymers and gelatin. These suspension stabilizers may be used singularly, or in combinations of two or more different stabilizers. The quantity of the suspension stabilizer added may be suitably selected from within a range from 0.02 to 1 part by weight per 100 parts by weight of the monomer.

Furthermore, other conditions associated with the polymerization, such as the method of supplying the aqueous medium, the vinyl chloride or the monomer mixture containing vinyl chloride, the suspension stabilizer and the polymerization initiator and the like to the polymerization vessel, the relative proportions within the reaction mixture and the polymerization temperature may be similar to conventional processes.

(Other Additives)

Moreover in a process of the present invention, where necessary, other additives typically used in the production of vinyl chloride-based polymers such as polymerization degree regulators, chain transfer agents and antistatic agents may also be added to the polymerization system.

EXAMPLES

As follows is a more detailed description of the present invention using a series of examples. However, the present invention is in no way limited to the examples presented.

Example 1

In a stainless steel polymerization vessel of internal capacity 2 m³ were placed 980 kg of deionized water, 382 g kg of a partially saponified polyvinyl alcohol with a saponification ratio of 80.5 mol % and 143 g of hydroxypropylmethylcellulose with a methoxy substitution ratio of 28.5% by weight and a hydroxypropoxy substitution ratio of 8.9% by weight. The inside of the polymerization vessel was then degassed until the internal pressure reached 8 kPa·abs, and 700 kg of vinyl chloride monomer was added. With the mixture undergoing constant stirring, 385 g of t-amyl peroxyneodecanoate and 70 g of α-cumyl peroxyneodecanoate were added as polymerization initiators, while a temperature raising process was started by passing hot water through the polymerization vessel jacket. Once the temperature inside the polymerization vessel reached 57.0° C., the polymerization was allowed to proceed with the temperature maintained at this level.

When the polymerization conversion rate had reached 78%, the temperature inside the polymerization vessel was raised to 72° C. over a period of 15 minutes, and 350 g of a 40% by weight methanol solution of 3,5-di-t-butyl-4-hydroxytoluene was then added to the polymerization vessel, and the unreacted monomer was recovered. The polymer slurry was then dewatered and dried, yielding a vinyl chloride polymer. The yield of the thus obtained polymer was 87.0%. The time required for the polymerization is shown in Table 1.

The anti-initial discoloration of the product polymer was measured using the method described below. The results of the measurement are shown in Table 1.

Anti-Initial Discoloration

To 100 parts by weight of the polymer were added 0.8 parts by weight of liquid octyl tin mercaptan, 0.8 parts by weight of a liquid Ca/Zn-based stabilizer, 0.1 parts by weight of polyethylene wax, and 50 parts by weight of dicoctyl phthalate, and following kneading for 5 minutes at 155° C. using a roller, the mixture was press molded to form a sheet-like sample. This sample was then measured using a differential colorimeter.

In accordance with the photoelectric tristimulus colorimetry method disclosed in JIS Z 8730 (2002) 6.2, a photoelectric colorimeter (Spectro Color Meter SE 2000, manufactured by Nippon Denshoku Industries Co., Ltd.) was used to directly measure the values of L (the psychometric lightness), a and b for the sample.

The anti-initial discoloration of the polymer was then evaluated based on these measured results, and the evaluation was recorded in Table 1, using either the symbol O if the anti-initial discoloration was good, or the symbol x if the anti-initial discoloration was poor.

Examples 2 and 3

With the exceptions of using the types and quantities of oil soluble polymerization initiators shown in Table 1, polymerizations were conducted in the same manner as the example 1. The results are shown in Table 1.

Comparative Examples 1 and 2

With the exceptions of using the types and quantities of oil soluble polymerization initiators shown in Table 1, polymerizations were conducted in the same manner as the example 1. The results are shown in Table 1.

Comparative Example 3

In a stainless steel polymerization vessel of internal capacity 2 m³ were placed 980 kg of deionized water, 382 g kg of a partially saponified polyvinyl alcohol with a saponification ratio of 80.5 mol % and 143 g of hydroxypropylmethylcellulose with a methoxy substitution ratio of 28.5% by weight and a hydroxypropoxy substitution ratio of 8.9% by weight. The inside of the polymerization vessel was then degassed until the internal pressure reached 8 kPa·abs, and 700 kg of vinyl chloride monomer was added. With the mixture undergoing constant stirring, 385 g of t-amyl peroxyneodecanoate and 70 g of α-cumyl peroxyneodecanoate were added as polymerization initiators, while a temperature raising process was started by passing hot water through the polymerization vessel jacket. Once the temperature inside the polymerization vessel reached 57.0° C., the polymerization was allowed to proceed with the temperature maintained at this level.

When the pressure inside the polymerization vessel reached 0.67 MPa·G, 350 g of a 40% by weight methanol solution of 3,5-di-t-butyl-4-hydroxytoluene was added to the polymerization vessel, and the unreacted monomer was recovered. The polymer slurry was then dewatered and dried, yielding a vinyl chloride-based polymer. The yield of the thus obtained polymer was 83.0%. Other results are shown in Table 1.

Comparative Example 4

In a stainless steel polymerization vessel of internal capacity 2 m³ were placed 980 kg of deionized water, 382 g kg of a partially saponified polyvinyl alcohol with a saponification ratio of 80.5 mol % and 143 g of hydroxypropylmethylcellulose with a methoxy substitution ratio of 28.5% by weight and a hydroxypropoxy substitution ratio of 8.9% by weight. The inside of the polymerization vessel was then degassed until the internal pressure reached 8 kPa·abs, and 700 kg of vinyl chloride monomer was added. With the mixture undergoing constant stirring, 385 g of t-amyl peroxyneodecanoate and 70 g of α-cumyl peroxyneodecanoate were added as polymerization initiators, while a temperature raising process was started by passing hot water through the polymerization vessel jacket. Once the temperature inside the polymerization vessel reached 57.0° C., the polymerization was allowed to proceed with the temperature maintained at this level.

When the pressure inside the polymerization vessel reached 0.55 MPa·G, 350 g of a 40% by weight methanol solution of 3,5-di-t-butyl-4-hydroxytoluene was added to the polymerization vessel, and the unreacted monomer was recovered. The polymer slurry was then dewatered and dried, yielding a vinyl chloride-based polymer. The yield of the thus obtained polymer was 87.2%. Other results are shown in Table 1.

Comparative Example 5

With the exception of not adding the 350 g of a 40% by weight methanol solution of 3,5-di-t-butyl-4-hydroxytoluene, a polymerization was conducted in the same manner as the example 1. The results are shown in Table 1.

TABLE 1

| | Example 1 | Example 2 | Example 3 | Comparative example 1 | Comparative example 2 | Comparative example 3 | Comparative example 4 | Comparative example 5 |
|---|---|---|---|---|---|---|---|---|
| Oil soluble initiator | TAND 392 g CND 70 g | TAND 315 g CND 70 g EHP 85 g | TAND 315 g CND 70 g TBND 85 g | EHP 427 g CND 70 g | TBND 427 g CND 70 g | TAND 392 g CND 70 g | TAND 392 g CND 70 g | TAND 392 g CND 70 g |
| Antioxidant | BHT 70 g | BHT 70 g | BHT 70 g | BHT 70 g | BHT 70 g | BHT 70 g | BHT 70 g | none |
| Polymerization time | 4 hours 00 minutes | 3 hours 59 minutes | 4 hours 02 minutes | 4 hours 01 minutes | 4 hours 03 minutes | 4 hours 00 minutes | 4 hours 25 minutes | 4 hours 01 minutes |
| Yield | 87.0% | 87.5% | 86.5% | 87.0% | 85.8% | 83.0% | 87.2% | 87.2% |
| Anti-initial discoloration | | | | | | | | |
| L | 70.8 | 70.5 | 70.7 | 70.1 | 70.7 | 70.8 | 70.7 | 70.2 |
| a | −0.7 | −0.9 | −0.8 | −1.2 | −0.7 | −0.6 | −0.7 | −1.0 |
| b | 13.4 | 13.7 | 13.5 | 14.9 | 13.5 | 13.3 | 13.4 | 14.0 |
| Anti-initial discoloration evaluation | ○ | ○ | ○ | x | O | ○ | ○ | x |

TAND: t-amyl peroxyneodecanoate
CND: α-cumyl peroxyneodecanoate
EHP: di-2-ethylhexyl peroxydicarbonate
TBND: t-butyl peroxyneodecanoate
BHT: 3,5-di-t-butyl-4-hydroxytoluene According to a process for producing a vinyl chloride-based polymer of the present invention, the anti-initial discoloration of the product vinyl chloride-based polymer is good, and the yield can be improved without extending the polymerization time, enabling an improvement in productivity.

What is claimed is:

1. A process for producing a vinyl chloride-based polymer comprising conducting a suspension polymerization of either vinyl chloride monomer or a mixture of vinyl chloride monomer and a monomer capable of copolymerization with the vinyl chloride monomer, in an aqueous medium and using an oil soluble polymerization initiator in an aqueous medium and using an oil soluble polymerization initiator in a polymerization vessel, wherein
the oil soluble polymerization initiator comprises:
(A) t-amyl peroxyneodecanoate, and
(B) an organic peroxide that is different from the component (A) and has a 10 hour half-life temperature in a solution with a concentration of 0.1 mol/liter in trichloroethylene within a range from 30° C. to 55° C., and
when the polymerization conversion rate reaches a value within a range from 65% to 90%, the reaction temperature of a polymerization mixture inside the polymerization vessel is raised by a temperature increase of between 5 and 30° C., followed by addition of an antioxidant to said polymerization mixture,
wherein a ratio of quantities of said component (A) and said component (B), in terms of a weight ratio (A)/(B), is within a range from 1/5 to 5/1;
a combined quantity of said component (A) and said component (B) is within a range from 0.02 to 0.15 carts by weight per 100 carts by weight of said vinyl chloride monomer or said mixture of vinyl chloride monomer and a monomer capable of copolymerization with vinyl chloride monomer; and
said vinyl chloride-based polymer has an improved anti-initial discoloration property.

2. The process according to claim 1, wherein said organic peroxide of the component (B) has a 10 hour half-life temperature in a solution with a concentration of 0.1 mol/liter in trichloroethylene within a range of at least 30° C. but less than 55° C., and when the polymerization conversion rate reaches a value within a range of at least 65% but less than 90%, said reaction temperature is raised by a temperature increase of between 5 and 30° C., followed by addition of an antioxidant to said polymerization mixture.

3. The process according to claim 1, wherein said component (B) is at least one organic peroxide selected from the group consisting of diisobutyl peroxide, 3-hydroxy-1,1-dimethylbutyl peroxyneodecanoate, α-cumyl peroxyneodecanoate, 1,1,3,3-tetramethylbutyl peroxyneodecanoate, t-butyl peroxyneodecanoate, t-butyl peroxyneoheptanoate, diisopropyl peroxydicarbonate, di-sec-butyl peroxydicarbonate and di-2-ethylhexyl peroxydicarbonate.

4. The process according to claim 1, wherein if a reaction temperature inside said polymerization vessel is less than 59° C., an organic peroxide with said 10 hour half-life temperature within a range from 30° C. to 50° C. is used as said component (B).

5. The process according to claim 4, wherein said organic peroxide used as said component (B) has a 10 hour half-life temperature within a range of at least 30° C. but less than 50° C.

6. The process according to claim 1, wherein if a reaction temperature inside said polymerization vessel is 59° C. or higher, an organic peroxide with said 10 hour half-life temperature within a range from 44° C. to 55° C. is used as said component (B).

7. The process according to claim 6, wherein said organic peroxide used as said component (B) has a 10 hour half-life temperature within a range of at least 44° C. but less than 55° C.

8. The process according to claim 1, wherein said value of the polymerization conversion rate reached is within a range from 65% to 85%.

9. The process according to claim 1, wherein said value of the polymerization conversion rate reached is within a range from 70% to 80%.

10. The process according to claim 1, wherein a combined quantity of said component (A) and said component (B) is within a range from 0.04 to 0.13 parts by weight per 100 parts by weight of said vinyl chloride monomer or said mixture of vinyl chloride monomer and a monomer capable of copolymerization with vinyl chloride monomer.

11. The process according to claim 1, wherein said antioxidant is at least one antioxidant selected from the group consisting of 3,5-di-t-butyl-4-hydroxytoluene, t-butylhydroxyanisole, t-butylhydroquinone, 2,6-di-t-butyl-4-sec-butylphenol and n-octadecyl-3-(3,5-di-t-butylphenyl-4-hydroxyphenyl)propionate.

12. The process according to claim 1, wherein a quantity of said antioxidant used is within a range from 0.005 to 0.05 parts by weight per 100 parts by weight of said vinyl chloride monomer or said mixture of vinyl chloride monomer and a monomer capable of copolymerization with vinyl chloride monomer.

* * * * *